(12) United States Patent
Rimmer et al.

(10) Patent No.: US 7,738,371 B1
(45) Date of Patent: Jun. 15, 2010

(54) METHOD AND SYSTEM FOR ROUTING NETWORK PACKETS

(75) Inventors: Todd M Rimmer, Exton, PA (US); Thomas R. Prohofsky, Edina, MN (US); Duane J. McCrory, Malvern, PA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 181 days.

(21) Appl. No.: 12/201,503

(22) Filed: Aug. 29, 2008

(51) Int. Cl.
*H04L 12/26* (2006.01)
(52) U.S. Cl. ..................................... 370/231
(58) Field of Classification Search .................. None
See application file for complete search history.

(56) References Cited

U.S. PATENT DOCUMENTS

| | | | |
|---|---|---|---|
| 6,628,615 B1 * | 9/2003 | Joseph et al. | 370/231 |
| 6,988,161 B2 | 1/2006 | McConnell et al. | |
| 7,400,590 B1 * | 7/2008 | Rygh et al. | 370/254 |
| 7,443,860 B2 * | 10/2008 | Johnsen et al. | 370/395.3 |
| 7,623,519 B2 * | 11/2009 | Tornetta et al. | 370/392 |
| 2004/0215848 A1 | 10/2004 | Craddock et al. | |
| 2005/0117579 A1 | 6/2005 | Tasaki et al. | |
| 2005/0286511 A1 | 12/2005 | Johnsen et al. | |
| 2008/0117914 A1 * | 5/2008 | Rider | 370/392 |

OTHER PUBLICATIONS

"Office Action from USPTO dated Jan. 25, 2010 for U.S. Appl. No. 12/201,437".

* cited by examiner

*Primary Examiner*—Chirag G Shah
*Assistant Examiner*—Otis L Thompson, Jr.
(74) *Attorney, Agent, or Firm*—Klein, O'Neill & Singh, LLP (57) ABSTRACT

Method and system for sending and receiving a network packet via an inter-switch link (ISL) is provided. The method includes receiving a network packet at a network port; obtaining a destination identifier from a packet header for the network packet; generating a physical port number for routing the network packet; generating a signal indicating that an inter-switch link for the physical port number is shared by a plurality of partitions; generating a first set of virtual lanes based on a service level to virtual lane mapping scheme; generating a second set of virtual lanes based on an inter-switch link (ISL) service level to virtual lane mapping scheme; and selecting a virtual lane from the first set of virtual lanes or the second set of virtual lanes; based on a signal generated from a partition key table.

14 Claims, 7 Drawing Sheets

| Partition Key 128 |
|---|
| Pkey1 |
| Pkey2 |
| PKey3 |
| PKey4 |
| ... |

| DLID 131 | Port No 132 |
|---|---|
| D1 | P1 |
| D2 | P4 |
| ... | ... |
| ... | ... |

| SL <br> 133A | VL Port 1 <br> 133B | ... | VL Port 36 <br> 133C |
|---|---|---|---|
| SL0 | VL0 | ... | VL2 |
| : | : | : | : |
| : | : | : | : |
| : | : | : | : |
| SL15 | : | : | : |

METHOD AND SYSTEM FOR ROUTING NETWORK PACKETS

BACKGROUND

1. Technical Field

The present disclosure relates to network systems.

2. Related Art

Network systems are commonly used to move network information (may also be referred to interchangeably, as frames, packets or commands) between computing systems (for example, servers) or between computing systems and network devices (for example, storage systems). A network device (may also be referred to as a network node) may operate both as receiving node and a transmitting node to receive and send network information.

Various industry standards, hardware and software components are typically used to implement network communication. InfiniBand ("IB") is one such industry standard typically used with computing systems and input/output (I/O) devices. The IB standard is used to create fabrics, which may encompass numerous (for example thousands) of interconnected hosts/switches/servers, all working in parallel to solve complex problems.

In large IB fabrics, often independent computing applications operate concurrently. Per the IB standard, the applications may be separated from each other based on Partitions, using a partition key primarily as a security feature; and Quality of Service (QOS).

QOS may be implemented by using independent paths within a fabric for different applications. The IB standard supports such implementation by allowing one to assign virtual lanes (VLs) based on Service Levels (SLs). Multiple VLs may be used for a single network link. Each VL uses independent buffers and queues moving network information, However, the IB standard limits the number of VLs that can be used for a given link to 15 and the number of SLs within the fabric are also limited to 16.

In large fabrics that may include thousands of nodes, different applications may be assigned to different partitions. The partitions may share one or more switches and inter-switch links (ISLs). This creates the undesirable situation in which traffic from many independent partitions is distributed across 16 or fewer SLs. This can result in undesirable interaction between partitions, such as contention and intentional or unintentional denial of service attacks.

SUMMARY

In one embodiment, a method for sending and receiving a network packet via an inter-switch link (ISL) is provided. The method includes receiving a network packet at a network port; obtaining a destination identifier from a packet header for the network packet; generating a physical port number for routing the network packet; generating a signal indicating that an inter-switch link for the physical port number is shared by a plurality of partitions; generating a first set of virtual lanes based on a service level to virtual lane mapping scheme; generating a second set of virtual lanes based on an inter-switch link (ISL) service level to virtual lane mapping scheme; and selecting a virtual lane from the first set of virtual lanes or the second set virtual lanes; based on a signal generated from a partition key table.

In another embodiment, a network port sending and receiving a network packet via an inter-switch link (ISL) is provided. The network port includes: (a) a routing table for storing (i) a plurality of destination identifier values; (ii) a plurality of port numbers identifying network ports that are used for transmitting network packets; and (iii) an ISL indicator value indicating whether the ISL is shared between a plurality of partitions; wherein a destination identifier value from the network packet received at the network port is used as index for the routing table; and based on the destination identifier value from the network packet, a physical port number and the indicator value are output from the routing table.

The network port further includes a service level to virtual lane mapping table for storing a plurality of service levels; wherein based on a service level obtained from the network packet, identifiers for a first set of virtual lanes are output from the service level to virtual lane mapping table.

The network port also includes an ISL to virtual lane mapping table for storing a service level and a plurality of virtual lane options corresponding to the service level; wherein the ISL to virtual lane mapping table generates identifiers for a second set of virtual lanes based on the service level obtained from the network packet.

The network port further includes a partition table for storing (i) a plurality of partition keys; (ii) a plurality of service level map select values; and (iii) a plurality of virtual lane method values; wherein based on a partition key value obtained from the network packet, a service level map select value is output from the pa on table used for selecting a virtual lane from the second set of virtual lanes.

In one embodiment, if the ISL indicator value output from the routing table indicates that the ISL is shared among the plurality of partitions and the virtual lane of value is configured to select a virtual lane from the second set of virtual lanes, then the virtual lane from the second set of virtual lanes is selected to route the network packet.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWING

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures:

FIGS. 26 and 2C show IB header examples;

DETAILED DESCRIPTION

Definitions

The following definitions are provided for convenience as they are typically (but not exclusively) used in the InfiniBand (IB) and general networking environment, implementing the various adaptive embodiments described herein.

"Core Switch": A switch used at the center of a fabric. Core switches are typically furthest from computing nodes (may also be referred to as "Compute Nodes").

"DLID": Destination local identifier (DLID) is a field in an IB packet for identifying a local subnet packet destination.

"Fabric": A collection of links, switches, routers that connect to a host channel adapter, which may be coupled to a server; or a target channel adapter, which may be coupled to a storage system.

"Inter-Switch Link (ISL)": A network link between two switches. Such links are typically between a leaf switch and an edge switch or between core switches. To transfer information, the links may operate at different rates, for example, 2.5 gigabits per second (2.5 Gb), 5 Gb, 10 Gb, 20 Gb and other speeds.

"Leaf Switch": A switch at the fabric. Leaf Switches are typically the closest to Compute Nodes.

"LID" (Local Identifier): An address assigned by a Subnet Manager (SM), unique within a subnet. A LID is used for directing packets within the subnet.

"Packet": A group of one or more network data word(s) used for network communication. For example, IB based fabrics use IB packets for network communication. A frame may also be considered a packet.

"Partition": A collection of ports that are allowed to communicate with one another. A port may be a member of multiple partitions simultaneously. Ports in different partitions are unaware of each other's presence.

"Partition key": A value within an IB header identifying membership within a partition, Per the IB standard, a partition key is typically used as a security tool to determine/validate membership within a partition.

"Partition Table": A table of partition keys stored at each network port. The table is typically used to determine if a port is authorized to communicate with another port.

"Path": A collection of links, switches and routers that a message traverses from a source port to a destination port. Within a subnet, a SLID, DLID and service level (SL) define a path.

"Port": An entity typically located at a channel adapter or a switch to which a network link is connected. There may be multiple ports on a single channel adapter and switches for enabling network communication.

"QOS": Quality of Service, metrics for predicting behavior, reliability, speed and latency of a network connection.

"Routing Table": A table that stores information for routing a packet based on addressing information (for example, DLID). A routing table is typically stored within a switch.

"Service Level (SL)": A value in an IB header that is used for identifying a virtual lane for an IB packet. According to the IB standard, while the appropriate virtual lane (VL) for a specific SL may differ, the SL remains the same.

"SLID": An address assigned to a source port by a Subnet Manager. A SLID value is typically included in an IB header.

"Subnet Manager" ("SM"): An entity used for configuring a subnet, where the subnet is a set of IB ports and associated links that have a common subnet identifier (ID). Subnets itself may be coupled to each other by routers. SM is typically implemented as application software executed at a computing system that has access to the various entities within a subnet.

"Switch": A device that facilitates network communication. Typically, a switch operates to comply with certain standard protocols/specifications, for example, the IS standard.

"Virtual Lane" (VL): A virtual lane is an independent path within a single physical link (for example, an ISL) that may be used for network communication as defined by Section 3.5.7 of the IB Specification. A virtual lane represents a set of transmit and receive buffers in a port. A data VL is used to send IB packets and according to the IB Specification, configured by a subnet manager based on a Service Level field in a packet.

To facilitate an understanding of the various embodiments, the general architecture and operation of an IB network switch is first described. The specific architecture and operation of the preferred embodiment will then be described with reference to the general architecture.

It is noteworthy that the disclosed embodiments are not limited to the IF environment. The capabilities disclosed herein are applicable to other network protocols and standards, for example, the Fibre Channel over Ethernet (FCOE) standard and others.

Figure 1A:
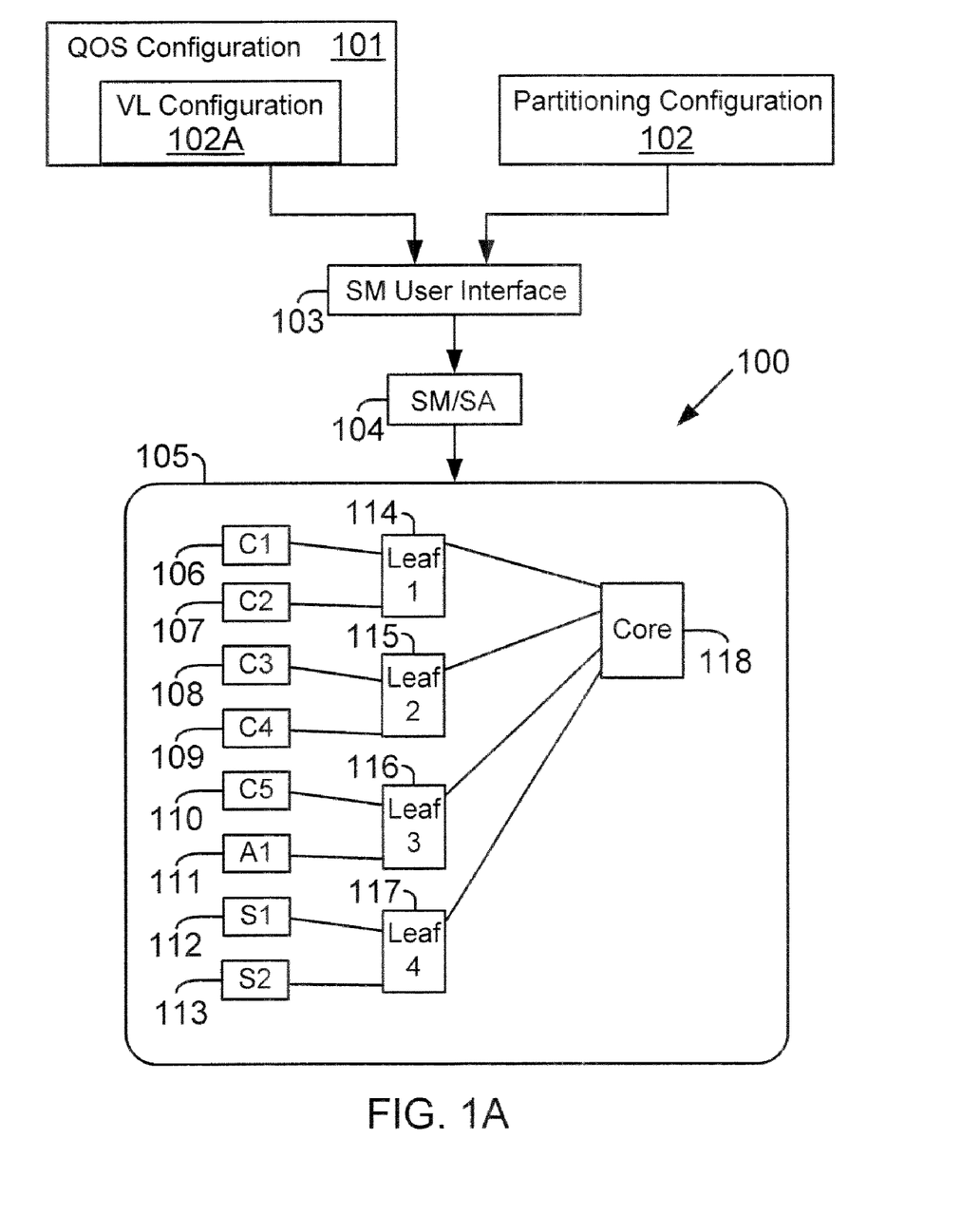
FIG. 1A shows an example of a system using the embodiments disclosed herein.

Network System:

FIG. 1A shows a block diagram of an IB based network system 100. Network system 100 includes a fabric 105 that is configured by using Subnet manager/subnet administrator (SM/SA) (jointly referred to as SM) 104. In one embodiment, SM 104 may be implemented as a software application executed by a computing system. SM 104 provides a user interface 103 that allows a user to input information to configure fabric 105 devices. In one embodiment, user interface 103 may be a command line interface (CLI) or a Graphical User Interface ("GUI").

In a conventional system, a user inputs separate QOS information 101 and partitioning information 102. QOS and partitions are set independent of each other. VL configuration information 102A may be part of QOS information and is used for VL configuration.

Fabric 105 includes various computing nodes and switches. For example, Fabric 105 may include computing nodes C1 106, C2 107, C3 108, C4 109 and C5 110, administration node A1 111, storage nodes S1 112 and S2 113, plural leaf switches leaf1 114, leaf2 115, leaf3 116, leaf4 117 and core switches (Core) 118.

Computing nodes 106-113 may include computing systems with several functional components. These components may include a central processing unit (CPU), main memory, input/output ("I/O") devices, and streaming storage devices (for example, tape drives). For a computing node, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system (or computing node) with the CPU and main memory is often referred to as a host system.

Figure 1B:
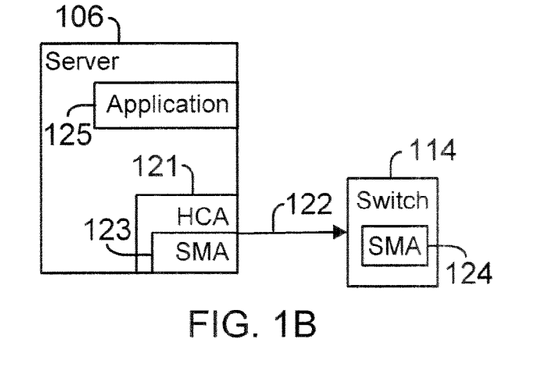
FIG. 1B shows an example of a computing node communicating with a switch, according to one embodiment.

Computing Node:

FIG. 1B shows an example of a computing node 106 (for example, an IB server) that is operationally coupled to switch 114 via a link 122. Computing node 106 includes host channel adapter (HCA) 121 that is coupled to switch 114 via link 122. HCA 121 interfaces with a server processor (not shown) to send and receive information via switch 114. Server 106 executes one or more applications 125 to communicate with other servers via link 122

Various applications 125 may concurrently operate in various computing nodes. These applications may be storage applications (for example, Network File System (NFS), Lustre File System provided by Sun Microsystems Inc.; or General Parallel File System ("GPFS") provided by IBM Corporation) based, network applications (for example, Secure Shell (SSH) applications, TELNET (a network protocol used the Internet and Local Area Networks) applications and/or Web servers), computing applications (for example, MPI (Message Passing Interface) applications such as LS-Dyna, an advanced general-purpose multiphysics simulation software package developed by the Livermore Software Technology Corporation (LSTC); or Fluent computational fluid dynamics software, developed by Fluent Inc.) and others.

As defined by the IS standard version 1.2, HCA 121 may include a Subnet Management Agent (SMA) 12 SMA 123 implements a SMA protocol, which is used by SM/SA 104 (FIG. 1A) to configure the QOS and partitioning attributes for HCA 121.

Figure 1C:
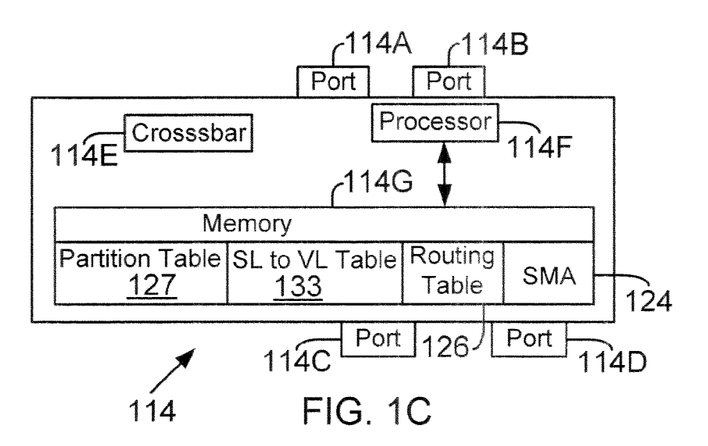
FIG. 1C shows an example of a switch, according to one embodiment.

Switch:

FIG. 1C shows an example of switch 114 used according to one embodiment of the present disclosure. Switch 114 may be an IB switch. Switch 114 includes a plurality of ports, shown as 114A-114D and a crossbar 114E. Ports 114A-114D may be coupled to other devices (including switches, servers and others) using links (for example, 122).

Switch 114 includes a processor module 114F that executes firmware out of memory 114G to control overall switch 114 operations. Memory 114G stores SMA 124 as defined by the IB standard. SMA 124 implements the SMA protocol, which is used by the SM/SA 104 to configure switch routing, QOS and partitioning attributes.

Figure 4A:
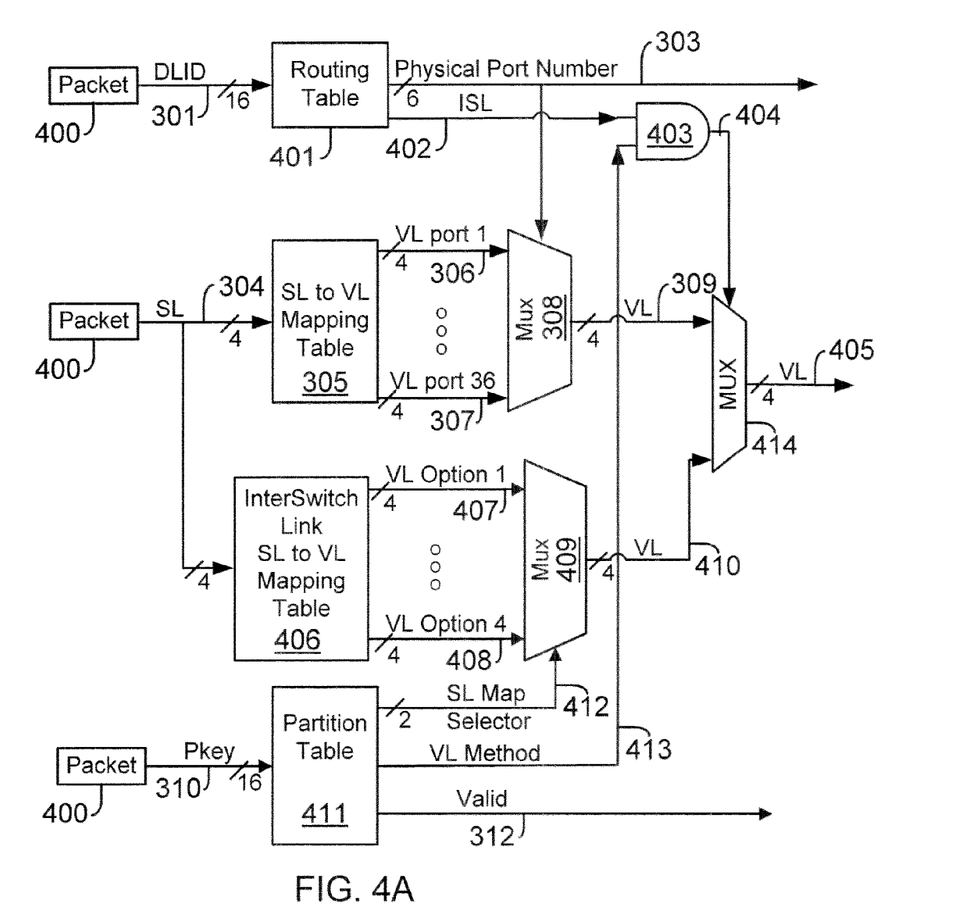
FIG. 4A shows an example of a system for routing packets, according to one embodiment.
Figure 4B:
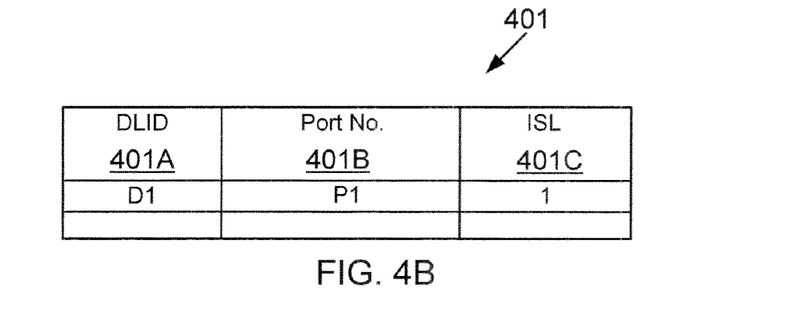
FIG. 4B shows an example of a routing table, according to one embodiment.

Switch 114 further stores a routing table 126 (shown in FIG. 1E) to route frames, a partition table 127 (shown in FIG. 1D), a SL to VL table 133 (shown in FIG. 1F) and an ISL SL to VL table 134 (shown in FIG. 4B). The various tables are described below.

Figure 1D:
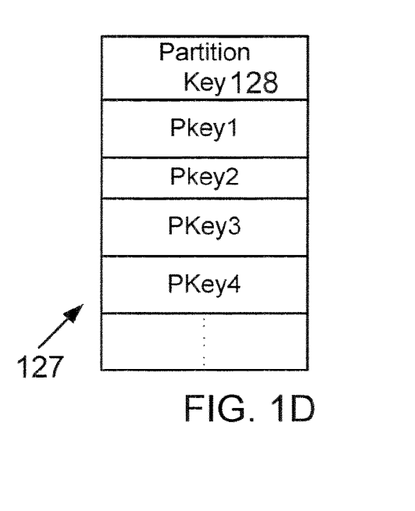
FIG. 1D shows an example of a conventional partition key table.

Partition Table/Routing Table/SL to VL Table:

FIG. 1D shows an example of a partition key table 127 as used by conventional systems. Partition key table 127 is set up by SM/SA 104 and may be stored at each input port in each node (for example, a switch and a HCA). Table 127 includes a column 128 that stores partition keys (Pkeys) that are permitted to be received on a given input port example, Pkey1 may be permitted to be received on this port).

Figure 1E:
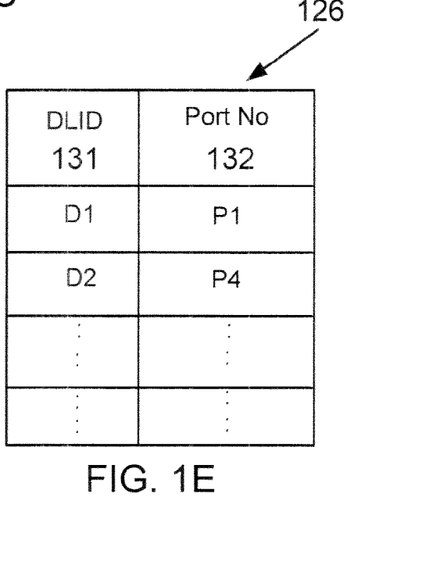
FIG. 1E shows an example of a conventional routing table.

FIG. 1E shows an example of a routing table 126 that includes columns 131 and 132. Column 131 includes the destination address (shown as DLID) for forwarding an IB packet. Column 132 stores an associated port number for routing an IB packet for a particular destination. For example, port number P1 may be used to send a packet with a DLID of D1. Port number P4 may be used to send a packet with a DLID of D2 and so forth.

Figure 1F:
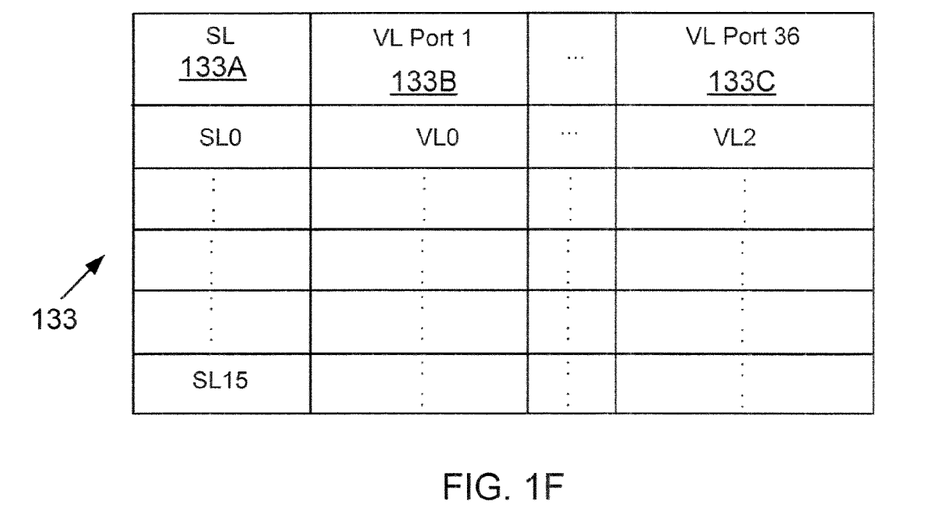
FIG. 1F shows a conventional SL to VL mapping table.

FIG. 1F shows a SL to VL mapping table 133 that is typically used to assign virtual lanes. SL to VL mapping table is set up by SM/SA 104 and may be stored at each input port in each node (for exam pie, a switch and a HCA). SL to VL mapping table 133 includes columns 133A, 133B and 133C. Column 133A includes the service levels and columns 133B and 133C include the associated virtual lanes for a given output port. Based on a frames SL field value and the output selected for routing the packet, a virtual lane is assigned to the packet.

Figure 1G:
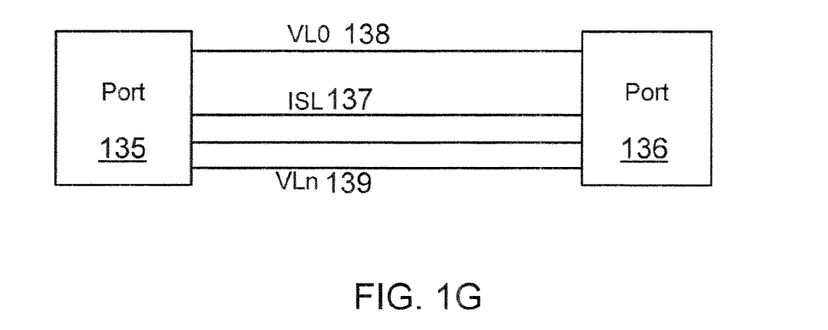
FIG. 1G shows a block diagram with virtual lanes, used for communicating network packets.

FIG. 1G shows a simplistic example for using virtual lanes in network communication. 135 is coupled to port 136 via link (or ISL) 137. Virtual lanes VL0 to VLn (shown as 138, 139) may be used route IB packets.

As discussed above, in conventional systems, the virtual lane selected for a given link is based solely on input port and service level of the packet. This approach has limitations especially in large fabrics with multiple network nodes and many applications. The adaptive embodiments described herein attempt to solve this problem.

Figure 2A:
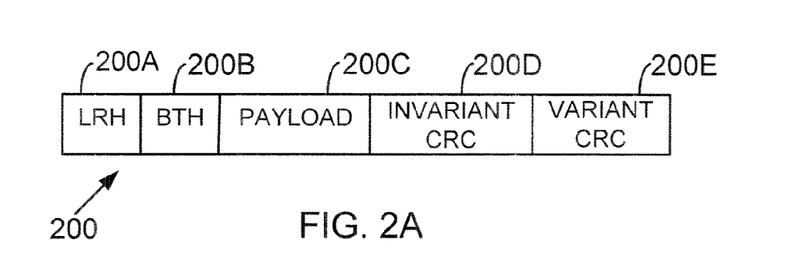
FIG. 2A shows an example of an IB packet.

IB Packet Structure:

FIG. 2A provides an example of a packet structure 200 that may be used in the various embodiments described herein. Packet structure 200 includes a local route header (LRH) 200A, a base transport header (BTH) 200B, packet payload 200C, invariant cyclic redundancy code (CRC) 200D, and variant CRC 200E. Packet structure 200 is described in Infiniband Architecture Specification, Volume 1, Chapter 6, titled "Data Packet Format", incorporated herein by reference in its entirety.

Figure 2B:
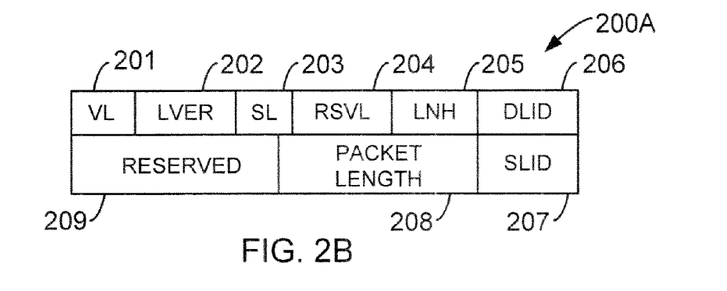

FIG. 2B shows a block diagram of LRH 200A, with various fields for routing packets within a subnet. LRH 200A includes a virtual lane (VL) field 201 that identifies which receive buffer and flow control credits should be used for processing a received packet, and link version (Lver) field 202 specifies the version of the LRH packet 200A.

LRH 200A also includes a service level (SL) field 203, a standard field that is used to identify VL for a packet and assigned by SM/SA 104. LRH 200A further includes a Link next header (LNH) field 205, which specifies what header follows LRH 200A. Fields 204 and 209 are reserved fields.

LRH 200A also includes a DLID field 206 that specifies the local destination to which switch 112 delivers the packet and SLID field 207 that indicates the local source of a network packet. Packet length field 208 specifies the number of words contained in a packet.

Figure 2C:
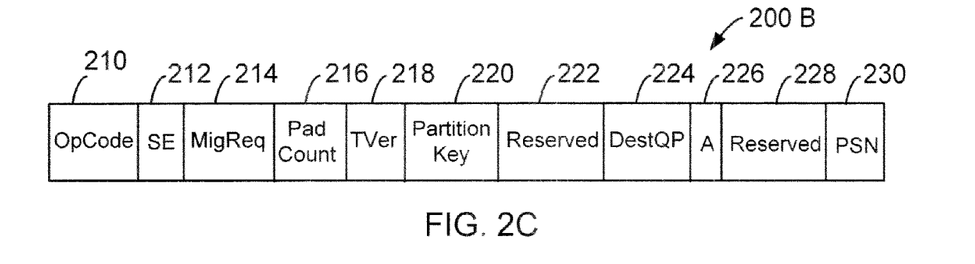

FIG. 2C shows a block diagram of a base transport header (BTH) 200B field of a packet, with plural fields. The BTH 200B field includes OpCode 210, Solicited. Event (SE) 212, MigReq 214, Pad Count 216, Transport Header Version (Tver) 218, Partition Key 220, Destination QP (DestQP) 224, Acknowledge Request ("A") 226, packet sequence number (PSN) 230 and two Reserved fields 222 and 228. The Partition Key 220 indicates which logical partition is associated with a packet. The DestQP 224 field indicates the work queue pair (QP) number at the destination. The PSN 230 field is used to detect a missing or duplicate packet.

Figure 3:
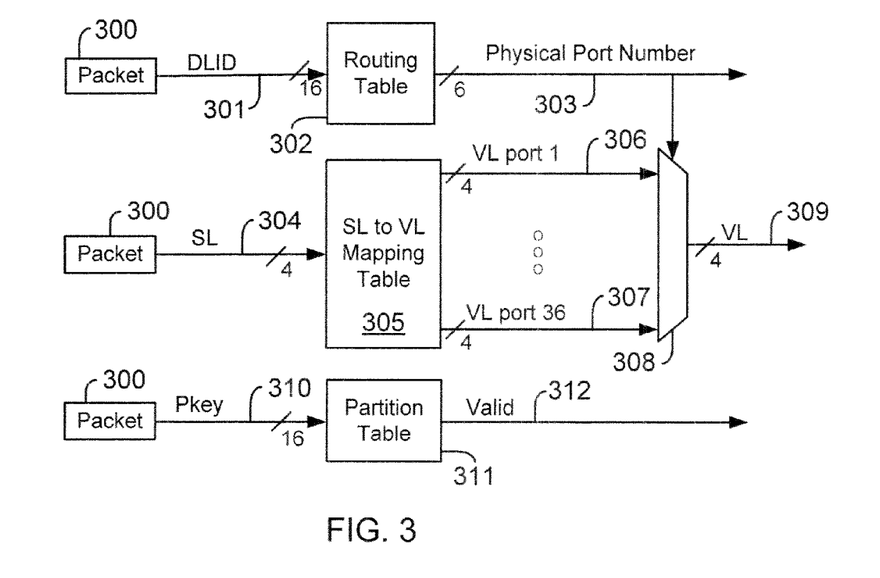
FIG. 3 shows an example of using conventional routing table and a conventional partition key table.

Conventional Packet Routing:

FIG. 3 shows an example of conventional packet routing, VL assignment based on SL values and use of Partition Keys (220, FIG. 2C). An IB packet 300 is received by a port, for example, Port 114A of switch 114. The DLID 301 (for example, 206, FIG. 2B, also shown in Column 131, FIG. 1E), SL 304 (similar to SL value stored in column 133A, FIG. 1F) and partition key 304 are processed in parallel.

DLID 301 is a 16-bit field that is used to determine a physical port number 303 (for example, stored in column 132, FIG. 1E) from a routing table 302 (similar to the routing table 126, described above with respect to FIG. 1E). The DLID 301 is used as an address/index into the routing table 302, to select a single row in the routing table 302. The given row includes the Physical Port Number 303. In one embodiment of a 36-port switch, the Physical Port Number may be 6 bits.

The Physical Port Number 303 is provided to the cross bar (for example, 114E, FIG. 1C) and specifies an output port (for example, 114B, 114C or 114D) to transmit the IB packet.

In parallel, for the same packet 300, a 4-bit Service Level field (SL) 304 (shown as 203, FIG. 2B) is provided to the SL to VL Mapping Table 305 (similar to table 133 shown in FIG. 1F). Per the IB standard, the SL to VL mapping value is based on the Physical Output port 303. In conventional systems, VLs for each potential output port (shown as 306-307, similar to VL values stored in column 133B and 133C, FIG. 1F)) that are based on input SL 304 and the Physical Port Number 303 are input to multiplexer (Mux) 308. One of the VLs that are input to Mux 308 is selected. The physical output port 303 to route packet 300 then uses the selected VL 309.

The partition key (also shown and referenced as "P-Key" or "Pkey") 310 is provided to the Partition Key Table (shown as P-Key Table) (similar to the P-Key table 127, FIG. 1D). The P-Key Table 311 is typically a Content Addressable Memory (CAM), which uses the P-Key 310 as an index. If P-Key 310 is found in table 311, then a Valid signal 312 is generated. The value of valid signal 312 indicates whether communication is permitted or not. For example, a valid signal value of 1 may indicate that communication between a source and destination is permitted. A valid signal value of 0 may indicate that communication between a source and destination is not permitted.

When the valid signal 312 is 0, the packet is discarded with an error and is not provided to the cross bar. When the valid signal 312 is 1, the packet is provided to cross bar 114E and is output via physical port number 303.

As shown in FIG. 3, there is no correlation between the use of partition keys, virtual lane assignment and the routing table. This has disadvantages, especially in fabrics with a large number of nodes and many applications. The enhanced packet routing described below provides an integrated solution that integrates the use of partition keys, virtual lane assignment and routing tables.

Enhanced Packet Routing:

FIG. 4A shows a system for enhanced packet routing, using a routing table 401, SL to VL mapping table 305 (that stores values similar to 133, FIG. 1F), an ISL SL to VL mapping table 406 and a partition table 411, according to one embodiment. When a network switch port receives a packet 400 (similar to packet 300, FIG. 3), the 16-bit DLID 301 from the packet is provided to routing table 401. The DLID 301 is used as an address/index to select a row from routing table 401.

FIG. 4B shows an example, of routing table 401 with columns 401A, 401B and 401C. Column 401A stores DLID values; Column 401B stores the numbers and Column 401C stores ISL indicator values (for example, 0 or 1). The ISL indicator value is set based on whether a given physical port number (for example, 303) is an ISL shared by multiple partitions.

Referring back to FIG. 4A, based on DLID 301, the Physical Port Number 303 and the ISL indicator 402 values are generated from routing table 401. If given Physical Port Number 303 uses an ISL, which is shared by multiple partitions, the ISL signal 402 may be set to 1, otherwise the ISL signal 402 may have a value of 0.

For the same packet 400, the 4-bit SL value 304 is provided to the SL to VL Mapping Table 305. As discussed above with respect to FIG. 3, various VLs (shown as 306-307) are output from the SL to VL mapping table 305 and then input to Mux 308. An output 309 from Mux 308 is then sent to Mux 414. Output 309 specifies the VL that is selected from among VLs 307. Output 309 in this case is based on the SL value and the physical port number value 303.

In addition, in parallel, the 4-bit T 304 value is also provided to the ISL SL to VL Mapping table 406 located at each input port. The ISL SL to VL Mapping table 406 generates multiple virtual lane options, (shown as 407-408) that are input to Mux 409.

Figure 4C:
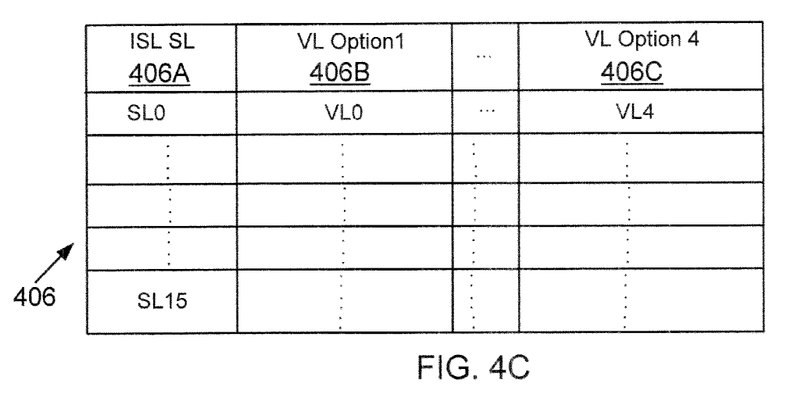
FIG. 4C shows an example of an ISL SL to VL mapping table, according to one embodiment.

FIG. 4C shows an example of ISL SL to VL table 406. The ISL SL to VL table 406 is set up by SM/SA 104 and may be stored at each input port in each switch 114. Table 406 include column 406A, 406B and 406C. Column 406A includes the service levels (SLs) and columns 406B and 406C includes the associated virtual lanes for a given VL Option. Based on the SL of a packet 400 a set of VL Options are looked up in columns 406B-406C and then output as 407-408 (see FIG. 4A).

Referring back to FIG. 4A, for the same packet 400, the 16-bit P-Key 310 is provided to the Partition Key (P-Key) Table 411. The P-Key Table 411 is typically a Content Addressable Memory (CAM), which uses the P-Key 310 as an index. If the given P-Key 310 is found in the table 411, the Valid signal 312 is 1, otherwise the valid signal 312 is 0.

When the valid signal 312 is 0, the packet is discarded with an error and is not provided to the cross bar When the valid signal 312 is 1, a corresponding SL Map Selector value 412 and VL Method value 413 are also obtained from the P-Key Table 411. In one embodiment the SL Map Selector 412 value may be 2 bits. The SL Map Selector 412 value is provided to Mux 409 and, is used to select one of the VL Options 407-408 (shown as VL 410).

Figure 4D:
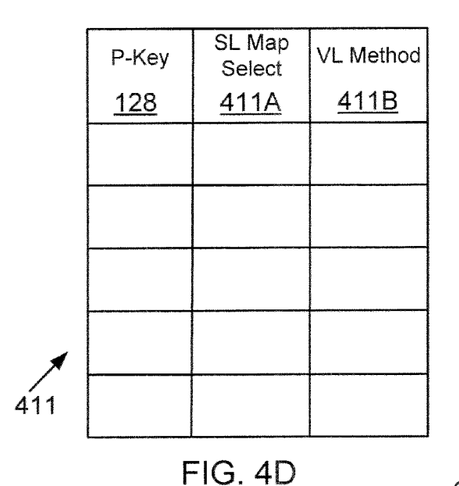
FIG. 4D shows an example of a Partition table according to one embodiment.

FIG. 4D shows an example of Partition-Key table 411, according to one embodiment. Table 411 includes column 28 that has been described above with respect to FIG. 1D. Table 411 further includes column 411A and 4115. Column 411A stores SL Map Select values 412 and Column 411B stores VL method values 413. In one embodiment, SM 104 assigns the VL method values.

Referring back to FIG. 4A, VL Option 410 and VL 309 are provided to Mux 414. If the ISL signal 402 and the VL Method 413 are both 1, then the AND gate 403 outputs a value of "1" (shown as 404). Based on the output from AND gate 403, Mux 414 selects VL 410 and outputs it as the VL for routing the packet (shown as VL 405).

If either the ISL signal 402 or the VL Method 413 are 0, then AND gate 403 outputs a value of "0" (shown as 404) and Mux 414 then selects VL 309 to route packet 400.

Figure 4E:
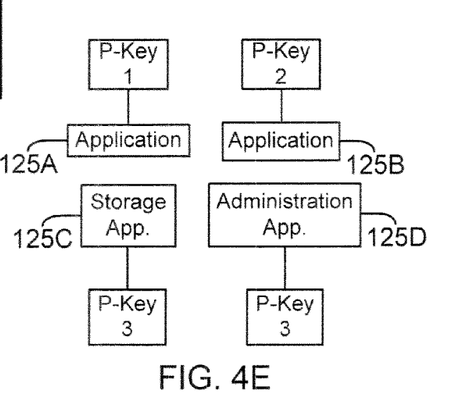
FIG. 4E shows an example plural applications associated with Partitions using partition keys, according to one embodiment.

The following provides an example of using the system of FIG. 4A. For illustration sake, assume that three applications 125 (shown as 125A-125D in FIG. 4E and shown in FIG. 1B) may be active at any given time. Applications 125A-125D may be of different type, for example, 125A and 125B may be a computing application (125A and 125B), 1250 may be a storage application 125C and 125D may be an administration application. Each application, 125A-125D may be assigned a P_Key using Partitioning Configuration 102 (FIG. 1A). Applications 125A-125C may run on servers 106-113 (FIG. 1A) as follows:

| Application | P-Key 310 | Servers |
|---|---|---|
| 125A | Pkey1 | 106, 107, 108 |
| 125B | Pkey2 | 109, 110 |
| 125C | Pkey3 | 106-113 |
| 125D | Pkey3 | 106-113 |

The storage application 125C and administration application 125D may be assigned the same partition key.

Each server 106-113 may be assigned a unique DLID 301. For simplicity sake, assume that the DLIDs 301 match the server number (e.g. Server 106 may be assigned DLID D106).

The QOS Configuration 101 (FIG. 1A), for example, may specify to use SL0 for Application SL0 for Application 125B, and SL1 or Storage application 125C and SL2 for Administration application 125D. A unique VL may also be used for each application where possible. SM/SA 104 may configure Core Switch 118 as follows:

Routing 401 Table:

| DLID 401A | Port Number 401B | ISL 401C |
|---|---|---|
| D106 | to Leaf1 114 | 1 |
| D107 | to Leaf1 114 | 1 |
| D108 | to Leaf2 115 | 1 |
| D109 | to Leaf2 115 | 1 |
| D110 | to Leaf3 116 | 1 |
| D111 | to Leaf3 116 | 1 |
| D112 | to Leaf4 117 | 1 |
| D113 | to Leaf4 117 | 1 |

Enhanced PKey Table 411 may be configured as follows:

| PKey 128 | SL Map Select 411A | VL Method 411B |
|---|---|---|
| Pkey1 | 1 | 1 |
| Pkey2 | 2 | 1 |
| Pkey3 | 3 | 1 |

ISL SL to VL Mapping Table 406 may be configured as follows:

| SL 406A | VL Option1 | VL Option2 | VL Option3 |
|---|---|---|---|
| SL0 | VL0 | VL1 | unused |
| SL1 | VL2 | VL2 | VL2 |
| SL2 | VL2 | VL2 | VL2 |

Since VL Method=1 and ISL=1 in the above table entries, the SL to VL Mapping table 133 is not used within Core switch 118 and hence is not shown above.

The SM/SA 104 would, example, configure Leaf Switch 115 as follows:

Routing 401 Table:

| DLID 401A | Port Number 401B | ISL 401C |
|---|---|---|
| D106 | to Core 118 | 0 |
| D107 | to Core 118 | 0 |
| D108 | to C3 108 | 0 |
| D109 | to C4 109 | 0 |
| D110 | to Core 118 | 0 |
| D111 | to Core 118 | 0 |
| D112 | to Core 118 | 0 |
| D113 | to Core 118 | 0 |

Enhanced PKey Table 411 may be configured as follows:

| PKey 128 | SL Map Select 411A | VL Method 411B |
|---|---|---|
| Pkey1 | 0 | 0 |
| Pkey2 | 0 | 0 |
| Pkey3 | 0 | 0 |

SL to VL Mapping Table 305 for Input from C3 108 may be configured as follows:

| SL 133A | VL for Port to C4 109 | VL for Port to Core118 |
|---|---|---|
| SL0 | unused | VL0 |
| SL1 | VL1 | VL2 |
| SL2 | VL2 | VL2 |

SL to VL Mapping Table 133 for Input from C4 109 may be configured as follows:

| SL 133A | VL for Port to C3 108 | VL for Port to Core118 |
|---|---|---|
| SL0 | unused | VL1 |
| SL1 | VL1 | VL2 |
| SL2 | VL2 | VL2 |

SL to VL Mapping Table 133 for input from Core 118 may be configured as follows:

| SL 133A | VL for Port to C3 108 | VL for Port to C4 109 |
|---|---|---|
| SL0 | VL0 | VL0 |
| SL1 | VL1 | VL1 |
| SL2 | VL2 | VL2 |

Since VL Method=0 and ISL=0 in all the above table entries, the ISL SL to VL Mapping table 406 is not used within Leaf switch 115 and hence is not shown above.

In this example, the configuration of Leaf switches 114, 116-117 would be similar.

In the foregoing example, separation of traffic for the three P-Keys 1, 2 and 3 may be achieved by using a unique VL for each P-Key on each link. The traffic on the shared ISL from Core Switch 118 to Leaf Switch 115 may use a unique VL (for example, 138-139 as shown in FIG. 1G) per P-Key as follows:

| Application | SL | Source -> Destination | VL used |
|---|---|---|---|
| 125A | SL0 | C1 106 -> C3 108 | VL0 |
| 125B | SL0 | C5 110 -> C4 109 | VL1 |
| 125C | SL1 | S2 113 -> C3 108 | VL2 |
| 125C | SL1 | S2 113 -> C4 109 | VL2 |
| 125D | SL2 | A1 111 -> C3 108 | VL2 |
| 125D | SL2 | A1 111 -> C4 109 | VL2 |

In this example the reverse traffic on the shared ISL from Leaf Switch 115 to Core Switch 118 may also use a unique VL per P-Key as follows:

| Application | SL | Source -> Destination | VL used |
|---|---|---|---|
| 125A | SL0 | C3 108 -> C1 106 | VL0 |
| 125B | SL0 | C4 109 -> C5 110 | VL1 |
| 125C | SL1 | C3 108 -> S2 113 | VL2 |
| 125C | SL1 | C4 109 -> S2 113 | VL2 |
| 125D | SL2 | C3 108 -> A1 111 | VL2 |
| 125D | SL2 | C4 109 -> A1 111 | VL2 |

Figure 5:
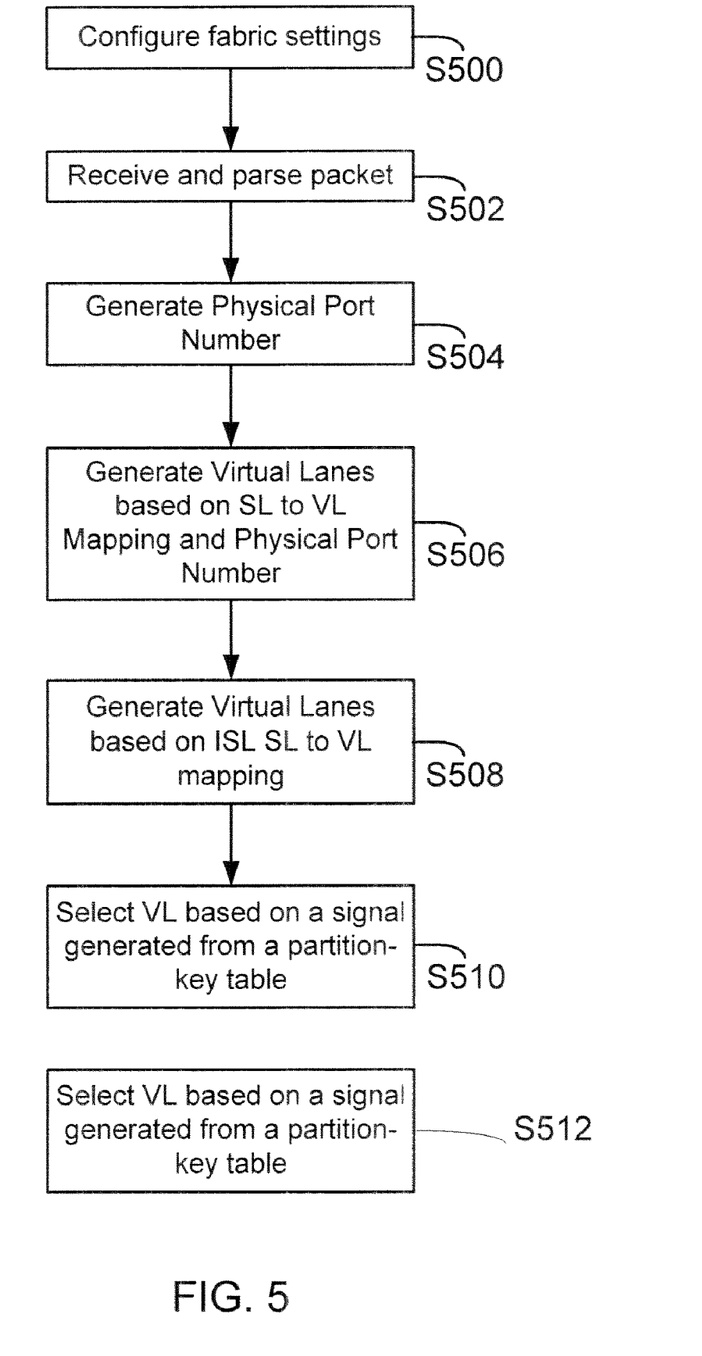
FIG. 5 shows a process flow diagram for routing packets, according to one embodiment.

Process Flow Diagram:

FIG. 5 shows a process flow diagram for routing packets, according to one embodiment. The process starts in step S500, when a SM 104 configures a fabric. During this step, the SM configures SD to VL mapping table 305 (FIG. 3), routing table 401, ISL SL to VL mapping table 406 and partition table 411. SM 104 evaluates a fabric (for example, 105, FIG. 1A) and then builds the various tables After the fabric is configured, a packet is received and parsed in step S502. The DLID (for example, 301, as shown in FIG. 4A) is extracted. In step S504, a physical port number 303 and ISL indicator 402 is generated from routing table 401. Based on the ISL indicator 402, one can determine if the physical port number 303 is an ISL shared by multiple partitions. For example, if ISL 402 is equal 1, then one can infer that the ISL is shared by multiple partitions.

In step S506; using SL to VL mapping table 305 and SL 304, plural VLs (306, 307) are generated.

In step S508, a plurality of VL options are generated using ISL SL to VL mapping table 406. The VL options are sent to a MUX, for example, Mux 409.

In step S510, based on a SL map Selector value 412, a VL is selected from the VL options that are generated in step S508. The selected VL option is sent to another Mux, for example, Mux 414.

In step S512, a VL is assigned. The VL assignment is based on a value of VL method signal 413 and ISL signal 402. For example, if ISL 402 is equal to 1 indicating that an ISL is being shared by multiple partitions; and VL method signal 413 is also equal to 1, one of the VL options generated from SL to VL mapping table is selected.

The foregoing embodiments retain all the benefits of the IB standard but also allow one to select a VL based on a combination of DLID, Service Level and partition keys. In large fabrics where there may be thousands of servers 106-113 and hundreds of applications, one can use unique VLs per application/partition key for each shared ISL without exhausting the 16 SL limit the IB Standard. In the example shown above, only 3 SLs were used yet traffic for the Four Applications 125A-125D were separated based on the application's partition key. This permits the fabric's 105 partitioning configuration 102 to provide security controls, which takes priority over QOS Configuration 101, and hence prevents traffic contention and denial of service attacks between different partitions.

Although the present disclosure has been described with reference to specific embodiments, these embodiments are illustrative only and not limiting. Many other applications and embodiments of the present disclosure will be apparent in light of this disclosure and the following claims.

What is claimed is:

1. A method comprising:

receiving a network packet at a network port;

obtaining a destination identifier from a packet header for the network packet;

generating a physical port number for routing the network packet;

generating a signal indicating that an inter-switch link for the physical port number is shared by a plurality of partitions;

generating a first set of virtual lanes based on a service level to virtual lane mapping scheme;

generating a second set of virtual lanes based on an inter-switch link (ISL) service level to virtual lane mapping scheme; and selecting a virtual lane from the first set of virtual lanes or the second set of virtual lanes, based on a signal generated from a partition key table and based on the signal indicating that the inter-switch link for the physical port number is shared by a plurality of partitions.

2. The method of claim 1, wherein a service map selector signal is used to select a virtual lane from the second set of virtual lanes.

3. The method of claim 1, wherein a virtual lane from the set of virtual lanes is selected based on the physical port number and if the ISL is not shared by the plurality partitions.

4. The method of claim 1, wherein the network packet is an InfiniBand ("IB") packet that is received by an IB switch port.

5. A network switch comprising:

a network port for sending and receiving a network packet via an inter-switch link (ISL); and memory for storing:

(a) a routing table storing (i) a plurality of destination identifier values; (ii) a plurality of port numbers identifying network ports that are used for transmitting network packets; and (iii) an ISL indicator value indicating whether the ISL is shared between a plurality of partitions; wherein a destination identifier value from the network packet received at the network switch is used as index for the routing table; and based on the destination identifier value from the network packet, a physical port number and the indicator value are output from the routing table;

(b) a service level to virtual lane mapping table storing a plurality of service levels; wherein based on a service level obtained from the network packet, identifiers for a first set of virtual lanes are output from the service level to virtual lane mapping table;

(c) an ISL to virtual lane mapping table storing a service level and a plurality of virtual lane options corresponding to the service level; wherein the ISL to virtual lane mapping table generates identifiers for a second set of virtual lanes based on the service level obtained from the network packet;

(d) a partition table storing (i) a plurality of partition keys; (ii) a plurality of service level map select values; and (iii) a plurality of virtual lane method values; wherein based on a partition key value obtained from the network packet, a service level map select value is output from the partition table used for selecting a virtual lane from the second set of virtual lanes;

wherein if the ISL indicator value output from the routing table indicates that the ISL is shared among the plurality of partitions and the virtual lane method value is configured to select a virtual lane from the second set of virtual lanes, then the virtual lane from the second set of virtual lanes is selected to route the network packet.

6. The network switch of claim 5, wherein if the ISL indicator value output from the routing table indicates that the ISL is not shared among the plurality of partitions then a virtual lane from the first set of virtual lanes is selected to route the network packet.

7. The network switch of claim 5, wherein if the ISL indicator value output from the routing table indicates that the ISL is shared among the plurality of partitions but the virtual lane method value output indicates not to select a virtual lane from the second set of virtual lanes, then a virtual lane from the first set of virtual lanes is selected to route the network packet.

8. The network switch of claim 5, wherein the network packet is an InfiniBand ("IB") packet that is received by an IB switch port.

9. The network switch of claim 5, wherein a subnet manager configures the routing table, the service level to virtual lane mapping table, the ISL to virtual lane mapping table, and the partition table.

10. A network, comprising:

a computing system executing an application; and a switch coupled to the computing system, wherein the switch includes a network port for sending and receiving a network packet via an inter-switch link (ISL), the switch including:

(a) a routing table for storing (ii) a plurality of destination identifier values;

(ii) a plurality of port numbers identifying network ports that are used for transmitting network packets; and (iii) an ISL indicator value indicating whether the ISL is shared between a plurality of partitions; wherein a destination identifier value from the network packet received at the network port is used as index for the routing table; and based on the destination identifier value from the network packet, a physical port number and the indicator value are output from the routing table;

(b) a service level to virtual lane mapping table for storing a plurality of service levels; wherein based on a service level obtained from the network packet, identifiers for a first set of virtual lanes are output from the service level to virtual lane mapping table;

(c) an ISL to virtual lane mapping table for storing a service level and a plurality of virtual lane options corresponding to the service level; wherein the ISL to virtual lane mapping table generates identifiers for a second set of virtual lanes based on the service level obtained from the network packet;

(d) a partition table for storing (i) a plurality of partition keys; (ii) a plurality of service level map select values; and (iii) a plurality of virtual lane method values;

wherein based on a partition key value obtained from the network packet, a service level map select value is output from the partition table used for selecting a virtual lane from the second set of virtual lanes;

wherein if the ISL indicator value output from the routing table indicates that the ISL is shared among the plurality of partitions and the virtual lane method value is configured to select a virtual lane from the second set of virtual lanes, then the virtual lane from the second set of virtual lanes is selected to route the network packet.

11. The network of claim 10, wherein if the ISL indicator value output from the routing table indicates that the ISL is not shared among the plurality of partitions then a virtual lane from the first set virtual lanes is selected to route the network packet.

12. The network of claim 10, wherein if the ISL indicator value output from the routing table indicates that the ISL is shared among the plurality of partitions but the virtual lane method value output indicates not to select a virtual lane from the second set of virtual lanes, then a virtual lane from the first set of virtual lanes is selected to route the network packet.

13. The network of claim 10, wherein the network packet is an InfiniBand ("IB") packet.

14. The network of claim 10, wherein a subnet manager configures the routing table, the service level to virtual lane mapping table; the ISL to virtual lane mapping table; and the partition table.

\* \* \* \* \*

UNITED STATES PATENT AND TRADEMARK OFFICE
CERTIFICATE OF CORRECTION

PATENT NO. : 7,738,371 B1 Page 1 of 2
APPLICATION NO. : 12/201503
DATED : June 15, 2010
INVENTOR(S) : Todd M Rimmer et al.

It is certified that error appears in the above-identified patent and that said Letters Patent is hereby corrected as shown below:

In column 1, line 35, delete "moving" and insert -- for moving --, therefor.

In column 1, line 35, delete "information," and insert -- information. --, therefor.

In column 1, line 62, delete "set" and insert -- set of --, therefor.

In column 2, line 26, delete "pa on" and insert -- partition --, therefor.

In column 2, line 30, delete "of value" and insert -- method value --, therefor.

In column 2, line 61, delete "26" and insert -- 2B --, therefor.

In column 3, line 5, delete "example" and insert -- example of --, therefor.

In column 3, line 34, delete "the fabric." and insert -- the edge of a fabric. --, therefor.

In column 3, line 49, delete "partition," and insert -- partition. --, therefor.

In column 5, line 4, delete "host" and insert -- a host --, therefor.

In column 5, line 9, delete "122" and insert -- 122. --, therefor.

In column 5, line 25, delete "12" and insert -- 123. --, therefor.

In column 5, line 37, delete "1140" and insert -- 114G --, therefor.

In column 5, line 38, delete "1140" and insert -- 114G --, therefor.

In column 5, line 53, delete "example," and insert -- (for example, --, therefor.

In column 5, line 66, delete "exam pie," and insert -- example, --, therefor.

Signed and Sealed this

Fifth Day of October, 2010

David J. Kappos
*Director of the United States Patent and Trademark Office*

CERTIFICATE OF CORRECTION (continued)
U.S. Pat. No. 7,738,371 B1

In column 6, line 3, delete "output" and insert -- output port --, therefor.

In column 6, line 7, delete "135" and insert -- Port 135 --, therefor.

In column 6, line 9, delete "used" and insert -- used to --, therefor.

In column 6, line 33, delete "identify" and insert -- identify a --, therefor.

In column 6, line 45, delete "Solicited." and insert -- Solicited --, therefor.

In column 7, line 51, delete "the" and insert -- the port --, therefor.

In column 8, line 29, delete "and," and insert -- and --, therefor.

In column 8, line 32, delete "column 28" and insert -- column 128 --, therefor.

In column 8, line 34, delete "4115." and insert -- 411B. --, therefor.

In column 9, line 9, delete "Application" and insert -- Application 125A, --, therefor.

In column 9, line 10, delete "or" and insert -- for --, therefor.

In column 9, line 48, delete "the" and insert -- all the --, therefor.

In column 11, line 16, delete "SD" and insert -- SL --, therefor.

In column 11, line 49, delete "limit" and insert -- limit of --, therefor.

In column 12, line 20, in claim 3, delete "set" and insert -- first set --, therefor.

In column 12, line 21, in claim 3, after "plurality" insert -- of --.

In column 13, line 22, in claim 10, delete "(ii)" and insert -- (i) --, therefor.

In column 14, line 23, in claim 11, after "first set" insert -- of --.